United States Patent
Hepburn et al.

[11] Patent Number: 5,910,096
[45] Date of Patent: Jun. 8, 1999

[54] TEMPERATURE CONTROL SYSTEM FOR EMISSION DEVICE COUPLED TO DIRECT INJECTION ENGINES

[75] Inventors: Jeffrey Scott Hepburn, Dearborn; Richard Eugene Baker, Dearborn Heights, both of Mich.

[73] Assignee: Ford Global Technologies, Inc., Dearborn, Mich.

[21] Appl. No.: 08/996,247

[22] Filed: Dec. 22, 1997

[51] Int. Cl.⁶ .................................................... F01N 3/00
[52] U.S. Cl. ............................... 60/274; 60/286; 60/276; 60/303
[58] Field of Search ............................ 60/286, 274, 303, 60/311, 276

[56] References Cited

U.S. PATENT DOCUMENTS

| | | |
|---|---|---|
| 5,207,058 | 5/1993 | Sasaki et al. ............................... 60/286 |
| 5,414,994 | 5/1995 | Cullen et al. . |
| 5,522,218 | 6/1996 | Lane et al. ................................. 60/286 |
| 5,564,283 | 10/1996 | Yano et al. ................................ 60/274 |
| 5,617,720 | 4/1997 | Achleitner et al. ........................ 60/274 |

FOREIGN PATENT DOCUMENTS 04231645  8/1992  Japan .

*Primary Examiner*—Christopher Verdier
*Assistant Examiner*—Binh Tran
*Attorney, Agent, or Firm*—Allan J. Lippa

[57] ABSTRACT

A direct injection spark ignition engine is disclosed in which fuel is injected during a compression stroke of each combustion chamber for stratified mode operation. Additional fuel is injected into each combustion chamber during its exhaust stroke while operating in the stratified mode to provide an exotherm for heating the NOx trap in response to a low temperature indication. When total fuel injected into the combustion chamber exceeds a predetermined value, engine operation is switched from the stratified to the homogeneous mode.

8 Claims, 2 Drawing Sheets

TEMPERATURE CONTROL SYSTEM FOR EMISSION DEVICE COUPLED TO DIRECT INJECTION ENGINES

BACKGROUND OF THE INVENTION

The field of the invention relates to temperature control of emission control devices coupled to direct injection spark ignition engines.

In direct injection spark ignition engines, the engine operates at or near wide open throttle during stratified air/fuel operation in which the combustion chambers contain stratified layers of different air/fuel mixtures. The strata closest to the spark plug contains a stoichiometric mixture or a mixture slightly rich of stoichiometry, and subsequent strata contain progressively leaner mixtures. The engine may also operate in a homogeneous mode of operation with a homogeneous mixture of air and fuel generated in the combustion chamber by early injection of fuel into the combustion chamber during its intake stroke. Homogeneous operation may be either lean of stoichiometry, at stoichiometry, or rich of stoichiometry.

Direct injection engines are also coupled to conventional three way catalytic converters to reduce CO, HC, and NOx. When operating at air/fuel mixtures lean of stoichiometry, a NOx trap or catalyst is typically coupled downstream of the three way catalytic converter to further reduce NOx.

The inventors herein have recognized that lean air/fuel operation may cause the catalytic converter and NOx trap to operate inefficiently. The inventors herein have also recognized numerous disadvantages in prior approached to heating catalytic converters. For example, retarding ignition timing is inefficient because engine surfaces such as cylinder walls will be heated in addition to heating exhaust gases. Further, the amount of heat which may be generated by retarding ignition timing is limited. And, retarding ignition timing is not feasible during stratified mode operation. The inventors also recognize that use of a variable length exhaust pipes to control NOx trap temperature is limited i8n the range of temperature change and not desirable because of cost and packaging.

SUMMARY OF THE INVENTION

An object of the invention herein is to control temperature of emission control devices coupled to direct injection spark ignition internal combustion engines without adding hardware and with minimal effect on fuel economy.

The above object is achieved, problems of prior approaches overcome, and the inherent advantages obtained, by providing a control method and system for a spark ignited four stroke engine having multiple combustion chambers coupled to an emission control device. In one particular aspect of the invention, the control method comprises injecting a first quantity of fuel directly into each of the combustion chambers to operate the combustion chambers at an average air/fuel mixture lean of stoichiometry; indicating when temperature of the emission control device is below a preselected temperature; and injecting an additional second quantity of fuel directly into each of the combustion chambers during an exhaust stroke of each of the combustion chambers to provide an exotherm for heating the emission control device in response to said low temperature indication.

An advantage of the above aspect of the invention is that temperature of the emission control device is maintained at a desired temperature for effective operation without creating wasted energy to heat the engine such as combustion chamber walls. A further advantage is that temperature of the emission control device is maintained at a desired temperature for effective operation without adding additional hardware.

In another aspect of the invention a control method is provided for a spark ignited four stroke engine having multiple combustion chambers with fuel injected directly into each combustion chamber and at least one of the combustion chambers being coupled to an emission control device and the combustion chamber has a homogeneous mode of operation with a homogeneous mixture of air and fuel and a stratified mode of operation with a stratified mixture of air and fuel. The method comprises injecting fuel into the combustion chamber during a compression stroke to operate the combustion chamber in the stratified mode; indicating when temperature of the emission control device is below a preselected temperature; injecting additional fuel into the combustion chamber during an exhaust stroke while the combustion chamber is operating in the stratified mode to provide an exotherm for heating the emission device in response to said low temperature indication; and switching from the stratified mode to the homogeneous mode and discontinuing the additional injection of fuel when total fuel injected into the combustion chamber exceeds a predetermined value. Preferably, the predetermined value of fuel occurs when total fuel injected during stratified operation, including the additional amount, is approximately equal to the fuel which would be expended during the homogeneous mode to produce substantially the same power. Stated another way, when the stratified mode no longer provides a fuel savings because of the additional fuel injected to maintain temperature of the emission control device, the engine air/fuel operating mode is switched to the homogeneous mode and injection of additional fuel is discontinued thereby maximizing fuel economy.

An advantage of the above aspect of the invention is that temperature of the emission control device is maintained at a desired temperature for effective operation without wasting any fuel.

DESCRIPTION OF THE DRAWINGS

The object and advantages of the invention claimed herein will be more readily understood by reading an example of an embodiment in which the invention is used to advantage with reference to the following drawings wherein:

DESCRIPTION OF AN EXAMPLE OF OPERATION

Figure 1:
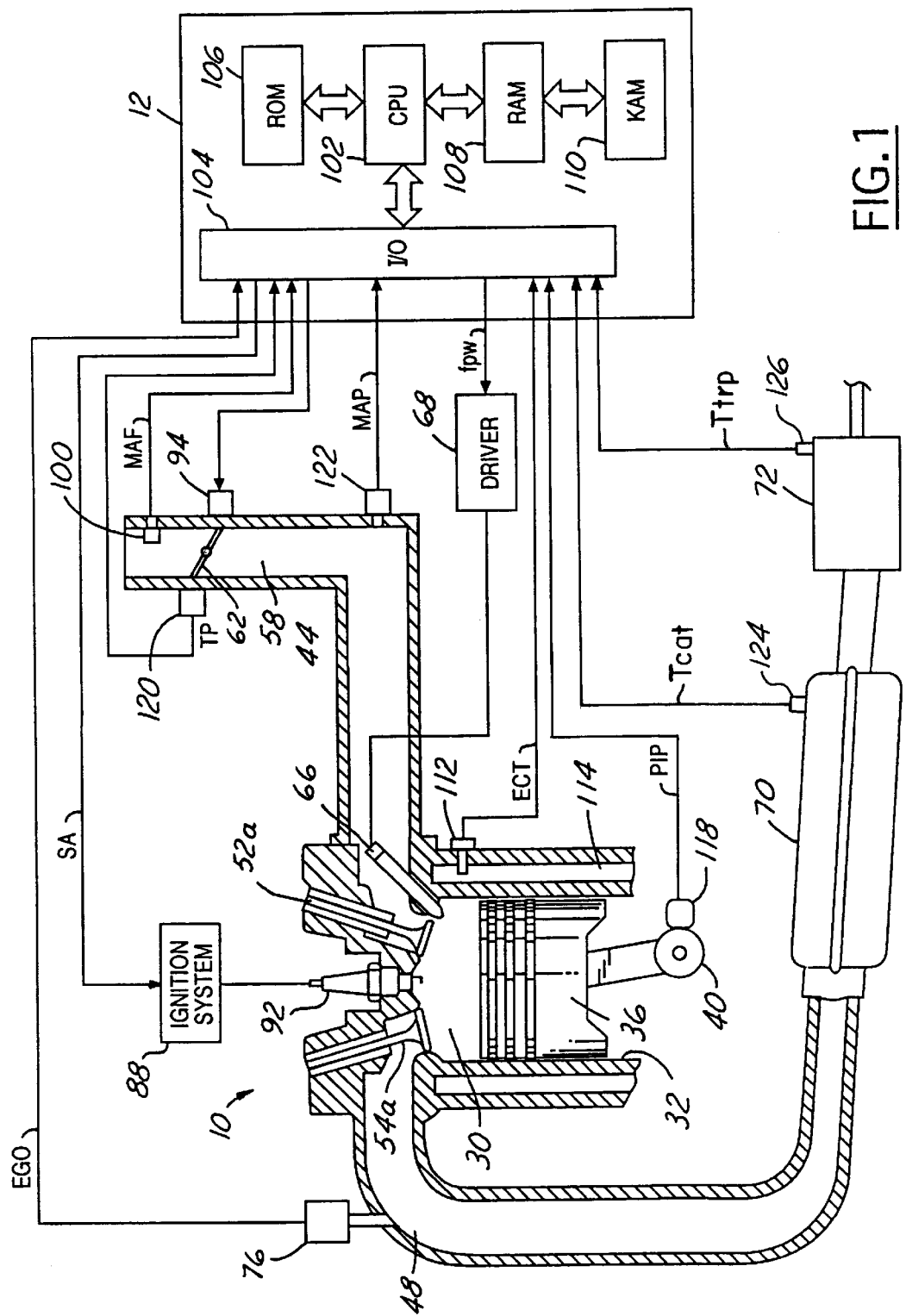
FIG. 1 is a block diagram of an embodiment in which the invention is used to advantage.

Direct injection spark ignited internal combustion engine 10, comprising a plurality of combustion chambers, is controlled by electronic engine controller 12. Combustion chamber 30 of engine 10 is shown in FIG. 1 including combustion chamber walls 32 with piston 36 positioned therein and connected to crankshaft 40. In this particular example piston 30 includes a recess or bowl (not shown) to help in forming stratified charges of air and fuel. Combustion chamber 30 is shown communicating with intake manifold 44 and exhaust manifold 48 via respective intake valves 52a and 52b (not shown), and exhaust valves 54a and 54b (not shown). Fuel injector 66 is shown directly coupled to combustion chamber 30 for delivering liquid fuel directly therein in proportion to the pulse width of signal fpw received from controller 12 via conventional electronic driver 68. Signal fpw represents the fuel pulse width in seconds that is sent from controller 12 to driver 68 determining the time duration in which injector 66 is energized. Fuel is delivered to fuel injector 66 by a conventional high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC) which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas oxygen sensor 76 is shown coupled to exhaust manifold 48 upstream of catalytic converter 70. In this particular example, sensor 76 provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS is used to advantage during feedback air/fuel control in a conventional manner to maintain average air/fuel at stoichiometry during the stoichiometric homogeneous mode of operation.

Conventional distributorless ignition system 88 provides ignition spark to combustion chamber 30 via spark plug 92 in response to spark advance signal SA from controller 12.

Controller 12 causes combustion chamber 30 to operate in either a homogeneous air/fuel mode or a stratified air/fuel mode by controlling injection timing. In the stratified mode, controller 12 activates fuel injector 66 during the engine compression stroke so that fuel is sprayed directly into the bowl of piston 36. Stratified air/fuel layers are thereby formed. The strata closest to the spark plug contains a stoichiometric mixture or a mixture slightly rich of stoichiometry, and subsequent strata contain progressively leaner mixtures. During the homogeneous mode, controller 12 activates fuel injector 66 during the intake stroke so that a substantially homogeneous air/fuel mixture is formed when ignition power is supplied to spark plug 92 by ignition system 88. Controller 12 controls the amount of fuel delivered by fuel injector 66 so that the homogeneous air/fuel mixture in chamber 30 can be selected to be at stoichiometry, a value rich of stoichiometry, or a value lean of stoichiometry. The stratified air/fuel mixture will always be at a value lean of stoichiometry, the exact air/fuel being a function of the amount of fuel delivered to combustion chamber 30. An additional split mode of operation wherein additional fuel is injected during the exhaust stroke while operating in the stratified mode is described later herein with particular reference to FIG. 2. The split mode is used to create an exotherm for heating catalytic converter 70 and NOx trap 72.

Nitrogen oxide (NOx) absorbent or trap 72 is shown positioned downstream of catalytic converter 70. NOx trap 72 absorbs NOx when engine 10 is operating lean of stoichiometry. The absorbed NOx is subsequently reacted with HC and catalyzed during a NOx purge cycle when controller 12 causes engine 10 to operate in either a rich homogeneous mode or a stoichiometric homogeneous mode.

Controller 12 is shown in FIG. 1 as a conventional microcomputer including: microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including: measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load.

In this particular example, temperature Tcat of catalytic converter 70 and temperature Ttrap of NOx trap 72 are inferred from engine operation as disclosed in U.S. Pat. No. 5,414,994 the specification of which is incorporated herein by reference. In an alternate embodiment, temperature Tcat is provided by temperature sensor 124 and temperature Ttrap is provided by temperature sensor 126.

Figure 2:
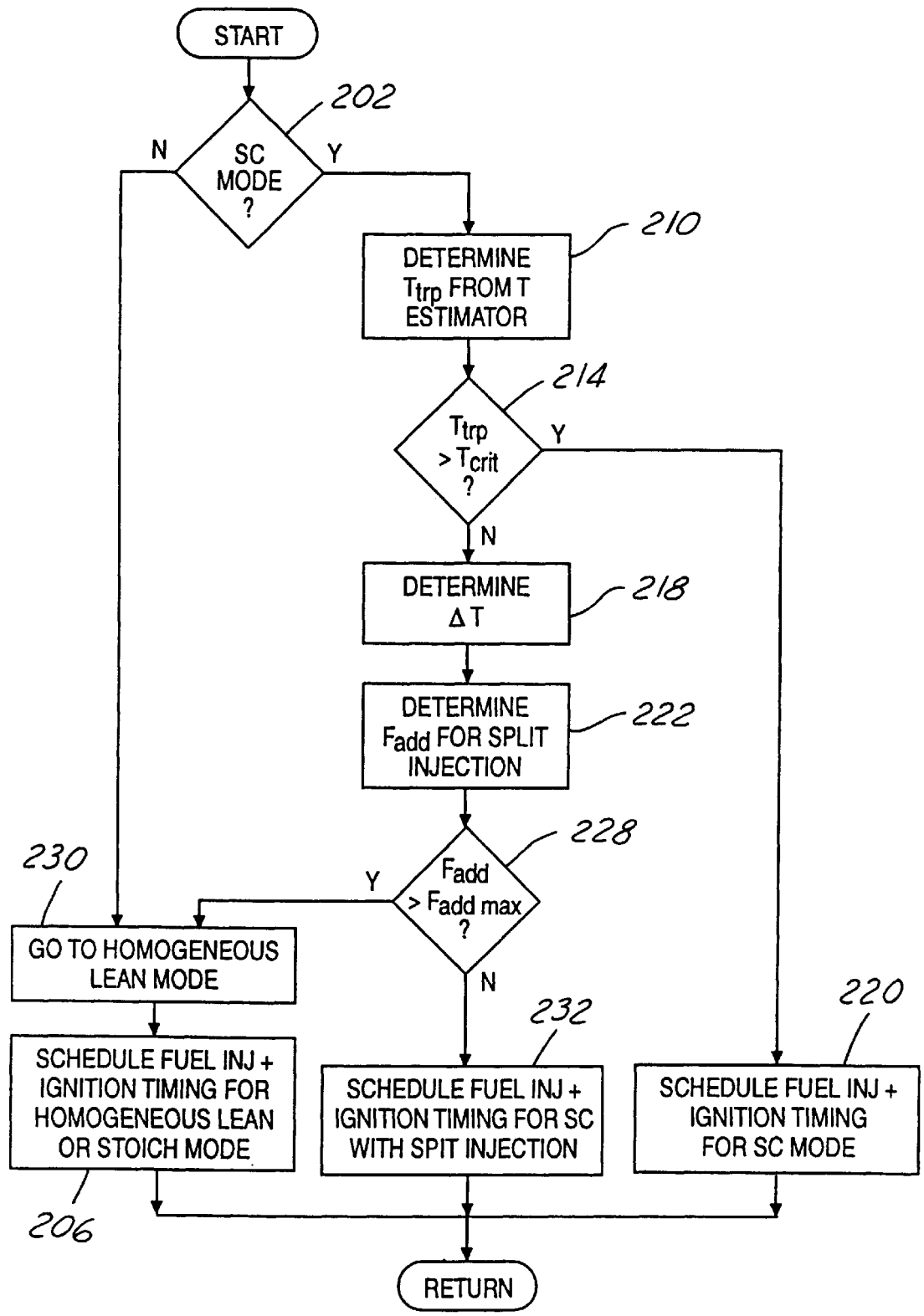
FIG. 2 is a high level flowchart which a portion of operation of the embodiment shown in FIG. 1

Referring now to FIG. 2, a process is described for maintaining the temperature of NOx trap 72, and if desired, catalytic converter 70, by use of the split mode injection timing previously referred to herein. When engine 10 is not operating in the stratified charge mode (SC) as indicated in step 202, fuel injection and ignition timing are scheduled for the homogeneous lean mode or homogeneous stoichiometric mode (step 206). Selection of homogeneous lean or stoichiometric mode is determined by other operating parameters such as desired power, fuel vapor purge, and NOx trap 72 purge.

When engine 10 is operating in the stratified mode (step 202), temperature of NOx trap 72 (Ttrp) is determined from the Temperature estimator. As previously described herein, the Temperature estimator is described in U.S. Pat. No. 5,414,994, the specification of which is incorporated herein. Alternatively, the temperature of NOx trap 72 may be provided by temperature sensor 126.

When NOx trap temperature Ttrp is greater than critical temperature (Tcrit), which is associated with lowest temperature for efficient trapping effectiveness of NOx trap 72 and HC oxidation of catalytic converter 70, engine operation continues with fuel injection and ignition timing scheduled for stratified charge mode (steps 214 and 220).

On the other hand, when NOx trap temperature Ttrap is less than critical temperature Tcrit (step 214), difference in temperature ΔT is determined in step 218. Additional quantity of fuel Fadd, which is proportional to ΔT is determined in step 222. Additional quantity of fuel Fadd is injected during the exhaust stroke of each combustion chamber to introduce unburned HC into the exhaust stream. The HC will create an exotherm with the oxygen occurring during lean stratified operation to heat catalytic converter 70 and NOx trap 72. In this manner, the temperature of NOx trap 72 is maintained above critical temperature Tcrit.

When additional fuel Fadd needed to raise NOx trap 72 temperature to the desired temperature is greater than the fuel savings associated with stratified engine operation, engine 10 is switched from the stratified mode to the homogeneous lean mode (steps 228 and 230). Stated another way, when additional fuel Fadd is greater than maximum fuel Faddmax (step 228), engine 10 is switched to the homogeneous lean mode (step 230). Fuel injection and ignition timing are then set for the homogeneous lean mode in step 206.

On the other hand, when additional fuel Fadd is less than Faddmax (step 228), stratified operation continues with additional fuel Fadd added as shown in step 232.

Those skilled in the art may also practice the invention by using the above described process to more rapidly heat catalytic converter 70 during engine cold start. And, the invention may be used to heat NOx trap 72 to a temperature associated with purging sulfur oxides.

This concludes a description of an example in which the invention is used to advantage. Those skilled in the art will recognize that many modifications may be practiced without departing from the spirit and scope of the invention. Accordingly, it is intended that the invention be limited only by the following claims.

What is claimed:

1. A control method for a spark ignited four stroke engine having multiple combustion chambers with fuel injected directly into each combustion chamber and at least one of the combustion chambers being coupled to an emission control device and the combustion chamber has a homogeneous mode of operation with a homogeneous mixture of air and fuel and a stratified mode of operation with a stratified mixture of air and fuel, comprising:

injecting fuel into the combustion chamber during a compression stroke to operate the combustion chamber in the stratified mode;

providing an indication of temperature of the emission control device;

indicating when said emission control device temperature is below a preselected temperature;

injecting additional fuel into the combustion chamber during an exhaust stroke while the combustion chamber is operating in the stratified mode to provide an exotherm for heating the emission device in response to said low temperature indication; and switching from the stratified mode to the homogeneous mode and discontinuing said injection of additional fuel when total fuel injected into the combustion chamber exceeds a predetermined value.

2. The method recited in claim 1 wherein said second quantity of fuel is proportional to a difference between said emission control device temperature and said preselected temperature.

3. The method recited in claim 1 wherein the emission control device comprises a catalytic converter.

4. The method recited in claim 1 wherein the emission control device comprises a NOx trap.

5. A control method for a spark ignited four stroke engine having multiple combustion chambers with fuel injected directly into each combustion chamber and at least one of the combustion chambers being coupled to an emission control device, comprising:

injecting fuel into the combustion chamber during a first time period corresponding to a compression stroke to operate the combustion chamber in a stratified mode with a stratified mixture of air and fuel;

indicating temperature of the emission control device;

providing a low temperature indication when said temperature indication is below a preselected temperature;

injecting additional fuel into the combustion chamber during a second time period corresponding to an exhaust stroke in response to said low temperature indication while the combustion chamber is operating in said stratified mode to provide an exotherm for heating the emission device; and changing said fuel injection during said first time period to injecting fuel during a third time period corresponding to an intake stroke so that said stratified mixture of air and fuel is changed to a homogeneous mixture of air and fuel and also ceasing said additional fuel injection during said second time period when a total of fuel injected into the combustion chamber exceeds a predetermined value.

6. The method recited in claim 5 wherein the emission control device comprises a catalytic converter.

7. The method recited in claim 5 wherein the emission control device comprises a NOx trap.

8. The method recited in claim 5 wherein said second quantity of fuel is proportional to a difference between said emission control device temperature and said preselected temperature.

* * * * *